United States Patent [19]

Towers et al.

[11] Patent Number: 4,599,185
[45] Date of Patent: Jul. 8, 1986

[54] REFRIGERANT ADDITIVE AND METHOD FOR REDUCING CORROSION IN REFRIGERATION SYSTEMS

[75] Inventors: James A. Towers, Mt. Prospect; Robert H. Krueger, Palatine, both of Ill.

[73] Assignee: Borg-Warner Corporation, Chicago, Ill.

[21] Appl. No.: 715,450

[22] Filed: Mar. 25, 1985

[51] Int. Cl.$^4$ .................. C09K 5/04; C10M 129/16; C10M 133/08; C10M 137/04

[52] U.S. Cl. ..................... 252/68; 252/32.5; 252/49.9; 252/78.5; 252/389.21; 260/403; 252/389 R

[58] Field of Search .............. 252/32.5, 49.9, 68, 252/78.5, 389.21; 260/403

[56] References Cited

U.S. PATENT DOCUMENTS

| | | | |
|---|---|---|---|
| 2,210,611 | 8/1940 | Widell | 62/119.5 |
| 2,221,162 | 11/1940 | Ashburn et al. | 260/403 |
| 2,244,416 | 6/1941 | Ashburn et al. | 252/389.21 |
| 2,249,340 | 7/1941 | Wilson et al. | 252/52 |
| 2,379,792 | 7/1945 | Donlan | 260/403 |
| 2,824,061 | 2/1958 | Davidson et al. | 252/32.5 |
| 2,975,137 | 3/1961 | Stuart | 252/68 |
| 3,375,197 | 3/1968 | Spauschus et al. | 252/68 |
| 3,878,112 | 4/1975 | Luck et al. | 252/10 |
| 4,046,533 | 9/1977 | Olund | 62/468 |
| 4,199,461 | 4/1980 | Olund | 252/68 |

FOREIGN PATENT DOCUMENTS 41388 4/1981 Japan.
8296 1/1982 Japan.

*Primary Examiner*—Paul Lieberman
*Assistant Examiner*—Robert A. Wax
*Attorney, Agent, or Firm*—Richard J. Schlott

[57] ABSTRACT

The addition of a phospholipid to the halogenated hydrocarbon working fluid of a refrigeration system serves to markedly reduce the corrosion of steel exposed thereto.

6 Claims, No Drawings

REFRIGERANT ADDITIVE AND METHOD FOR REDUCING CORROSION IN REFRIGERATION SYSTEMS

BACKGROUND OF THE INVENTION

This invention relates to lubrication of refrigeration systems of the closed, hermetically-sealed compression type including halogenated hydrocarbon refrigerant and a lubricant, and more particularly to additives for the prevention of corrosion in such systems.

Sealed refrigerating systems employing as a working fluid a combination of a halogenated hydrocarbon, a refrigerant and a lubricant are subject to wear and corrosion of the metal parts that come in contact with the working fluid. Many combinations of refrigerants and lubricants are subject to a slow deterioration that results in byproducts corrosive to the metal parts and particularly to the ferrous metal components of the compressor. Some system designs, and particularly those in which a less-than-ambient pressure condition exists, are particularly subject to the eventual intrusion of atmospheric oxygen and water. The presence of water and oxygen substantially increases the corrosion of the steel compressor parts, and particularly the steel shell, producing scale and other insoluble materials. These corrosion products are transported into and clog the interstices of heat exchange surfaces. This becomes a major problem in systems employing heat exchange tubing having porous surfaces, in as much as the porosity of these surfaces is rapidly reduced, resulting in a very substantial loss in efficiency.

A variety of approaches have been used to reduce such problems. Improved lubricants having better stability and complexity with refrigerants have been developed, as shown for example in U.S. Pat. Nos. 3,878,112 and 4,046,533. Additives such as metallodithiophosphates have been added to the working fluid to inhibit the interaction between the refrigerant and hydrocarbon lubricants, as shown in U.S. Pat. No. 3,375,197. The transfer of copper from heat exchange surfaces to the steel surfaces of the compressor by the working fluid can also contribute to the corrosion problem, and inhibitors have also been added to the working fluid to reduce such interactions, as shown in U.S. Pat. No. 2,975,137. System driers have also been devised and are widely used to continuously remove moisture from the system.

Corrosion inhibitors for use with aqueous fluids such as are found in adsorption refrigeration systems and the like are widely known. Additives are also widely used in non-aqueous lubricant systems for a great variety of applications, as well as in hydraulic fluids, transmission fluids and the like. In general, such additives are not known for use with halogenated hydrocarbon refrigerants, in as much as most are not soluble in common refrigerants and many promote decomposition of the refrigerant or increase the interaction between refrigerant and lubricant. However, an additive having the requisite solubility in refrigerants and effective in reducing or preventing corrosion under the conditions found in refrigeration systems would be highly useful, particularly for use in sealed systems that operate at less than atmospheric in ambient pressures.

SUMMARY OF THE INVENTION

Phospholipids such as for example lecithin are effective corrosion inhibitors for use with refrigerants. When added to halogenated hydrocarbon refrigerants, phospholipids are effective in reducing corrosion brought about by the presence of small amounts of water, oxygen and corrosive compounds associated with the deterioration or refrigerant systems.

DESCRIPTION OF THE EMBODIMENTS

Phospholipids, or phosphatides, are naturally occurring phosphate-containing glycerides found in animal and vegetable materials. Typical of such phospholipids is lecithin, a complex mixture obtained commercially from soybeans. Lecithin has many uses in the food industry as an additive and preservative, and in industrial applications as an interfacial agent in the manufacture of paints, lacquers, inks and the like. In commercial practice, the term lecithin refers to a complex mixture of acetone-insoluble phosphatides. Lecithin is widely available commercially and methods for its manufacture from natural sources are well known.

Lecithin is soluble in halogenated hydrocarbons commonly used as refrigerants, including the chlorofluoromethanes and chlorofluoroethanes. Examples of such refrigerants include dichlorofluoromethane, dichlorodifluoromethane, chlorodifluoromethane, trichloromonofluoromethane, dichlorotetrafluoroethanes, trichlorotrifluoroethanes and the like, all of which are used as refrigerants in commercial applications. Commercial refrigeration working fluids will further comprise a lubricant such as a hydrocarbon oil, as is well known in the art. The addition of lecithin to such working fluids in an amount effective to inhibit corrosion is readily accomplished by dispersing the requisite amount of lecithin in the working fluid, in as much as the additive is readily soluble. The amount of lecithin employed may vary over a wide range from 0.01 to 10 wt% or more. However, the additive is effective at low concentrations, hence will be employed in amounts of less than about 1 wt%.

The effectiveness of lecithin in reducing corrosion will be seen from a consideration of the following examples:

EXAMPLE 1

The effectiveness of lecithin as a corrosion inhibiting additive in refrigerants was demonstrated by immersing 2 sq. in. steel coupons in a mixture of containing 92 ml of R-113 refrigerant, 7 ml of hydrocarbon oil and 0.5 g of lecithin, to which 1.0 ml of 0.01N HCl containing 10 ppm ferric ion was added with stirring. The aqueous component separated forming a separate phase, insuring saturation of the refrigerant. As controls, equivalent mixtures without lecithin were employed. The steel coupons were sandblasted, cleaned with a mild soap solution, ultrasonically cleaned in isopropanol, dried at 80° C. and stored in a dessicator until used. The tests were run by suspending the weighed coupons from glass hooks in covered jars containing the refrigerant mixture for a period of three weeks. At the end of the test, the coupons were removed, cleaned of corrosion product by immersing in 500 ml of 37% HCl containing 25 g of $SnCl_2$ and 10 g of $SbCl_3$, then cleaned with isopropanol, dried and weighed as before. The degree of corrosion was determined by weight loss.

TABLE I

| Inhibitor | | Reduction | |
|---|---|---|---|
| type | wt % | % | Remarks |
| none | — | — | ppt |

TABLE I-continued

| Inhibitor | | Reduction | |
|---|---|---|---|
| type | wt % | % | Remarks |
| Lecithin | 0.5 | 90 | — |
| DBTD | 0.5 | 50 | ppt |
| TCP | 0.5 | 75 | — |

Note:
DBTD = dibutyl tin dilaurate; TCP = tricresylphosphate; ppt = precipitate formed in working fluid.

It will be apparent from these data that lecithin was highly effective in reducing scale. TCP and DBTD, both compounds known to be useful as corrosion inhibitors in other applications, were markedly less effective in this system.

EXAMPLE 2

Test solutions containing 560 mL of R-11 refrigerant, 50 ml of oil (Carpella C from Texaco Company) and varying amounts of lecithin. The solutions were placed in covered jars and steel coupons were suspended for two weeks at three different levels—(a) in the vapor space, (b) half immersed and (c) totally immersed, to demonstrate the effect of varying concentrations and immersions on corrosion inhibition. Water was introduced into the system twice each week by spraying the coupons with 2 ml of water.

The steel coupons were initially prepared by cleaning in trichlorethylene and acetone, then drying at room temperature with a stream of nitrogen and weighing. At the end of the test, the specimens were cleaned with an aqueous soap solution, dipped in HCl, rinsed with water and acetone, dried as before and reweighed to determined the corrosion by weight loss.

TABLE II

| Exposure Location | Lecithin (wt %) | wt loss (mg) | Reduction (%) |
|---|---|---|---|
| vapor | 0 | 34* | — |
| ½ immersion | 0 | 43* | — |
| immersed | 0 | 8* | — |
| vapor | 0.05 | 25 | 26 |
| ½ immersion | 0.05 | 8 | 81 |
| immersed | 0.05 | 0 | 100 |
| vapor | 0.2 | 22 | 35 |
| ½ immersion | 0.2 | 7 | 84 |
| immersed | 0.2 | 0 | 100 |
| vapor | 0.5 | 28 | 18 |
| ½ immersion | 0.5 | 2 | 95 |
| immersed | 0.5 | 1 | 88 |

Notes:
*Ave of 2 runs.

It will be seen that substantial reduction in corrosion occurs for composition containing as little as 0.05 wt% lecithin where partially or completely immersed. Corrosion in the vapor space is much less affected by lecithin at low concentrations.

The invention will thus be seen to be a method for inhibiting corrosion in refrigerant systems by incorporating into the working fluid an effective amount of a phospholipid such as lecithin, and a working fluid for use in such systems comprising a halogenated hydrocarbon, a lubricant and a phospholipid. It will be understood that further modifications, including the addition of further lubricant and wear additives, copper inhibiting compounds and the like may be made as will occur to those skilled in the art without departing from the spirit and scope of the invention as set forth in the appended claims.

We claim:

1. In a refrigeration system containing a working fluid comprising a halogenated hydrocarbon refrigerant and a lubricant, the improvement wherein an effective, corrosion-preventing amount of a phospholipid is included in said working fluid.

2. In the refrigeration system of claim 1, the improvement wherein said phospholipid is lecithin.

3. In the refrigeration system of claim 1, the improvement wherein said phospholipid is lecithin, in an amount of from 0.01 to about 10 wt%, based on working fluid.

4. In the refrigeration system of claim 1, the improvement wherein said phospholipid is lecithin in an amount of from 0.01 to about 1 wt%, based on working fluid.

5. A method for inhibiting corrosion in a refrigeration system employing as a working fluid a halogenated hydrocarbon, comprising adding to said working fluid from about 0.01 to about 10 wt% of a phospholipid.

6. The method of claim 5 wherein the phospholipid is lecithin.

* * * * *